(12) United States Patent
Nguyen et al.

(10) Patent No.: US 6,944,276 B1
(45) Date of Patent: Sep. 13, 2005

(54) SYSTEM AND METHOD TO DETECT PRIVACY SCREENING

(75) Inventors: Hong Thi Nguyen, Atlanta, GA (US); Linda A. Roberts, Decatur, GA (US); Edward M. Silver, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 438 days.

(21) Appl. No.: 10/055,242

(22) Filed: Jan. 23, 2002

(51) Int. Cl.[7] .............................................. H04M 1/56
(52) U.S. Cl. ........................ 379/142.02; 379/210.02; 379/196
(58) Field of Search ..................... 379/210.02, 142.02, 379/196

(56) References Cited

U.S. PATENT DOCUMENTS

| | | | |
|---|---|---|---|
| 5,436,957 A * | 7/1995 | McConnell | 379/88.23 |
| 5,701,301 A | 12/1997 | Weisser, Jr. | 370/428 |
| 5,838,774 A | 11/1998 | Weisser, Jr. | 379/92.02 |
| 6,353,663 B1 * | 3/2002 | Stevens et al. | 379/114.22 |

* cited by examiner

*Primary Examiner*—Ahmad F. Matar
*Assistant Examiner*—Rasha S. Al-Aubaidi
(74) *Attorney, Agent, or Firm*—Woodcock Washburn LLP

(57) ABSTRACT

A system and method enables a caller to detect subscribers to a privacy screening service. The caller detection of privacy screening is initiated when a subscriber to the caller detection of privacy screening service places a telephone call to a called party. After the calling party enters the telephone number of the called party, the caller detection of privacy screening service places a query to an SCP. The SCP determines if the called party is a subscriber to privacy screening. If the called party is a subscriber to privacy screening, the call is not completed, and a message is sent from the SCP to the SSP indicating that this is a caller detection of privacy screening call. This information is forwarded from the SSP to a billing system for processing as a caller detection of privacy screening charge. If the called party is not a subscriber to privacy screening, the call is completed and normal charges accrue.

19 Claims, 2 Drawing Sheets

Legend:
------------- Signaling System 7 (SS7) Data Links
———— Basic Rate Interface (BRI) Lines
— — — — Voice Lines
———— Voice Trunks

US 6,944,276 B1

SYSTEM AND METHOD TO DETECT PRIVACY SCREENING

FIELD OF THE INVENTION

This invention relates to the field of telecommunications. More particularly, the present invention relates to detecting a called party who subscribes to a privacy screening service.

BACKGROUND

In recent years, a number of new telephone service features have been provided by an Advanced Intelligent Network (AIN). The AIN evolved out of a need to increase the capabilities of the telephone network architecture in order to meet the growing needs of telephone customers or users. The AIN architecture generally comprises two networks, a data messaging network and a circuit-switched, trunked communications network. The trunked communications network handles voice and data communications between dispersed network locations, whereas the data messaging network is provided for controlling operations of the trunked communications network.

A privacy screening service is a service that enables a subscriber to screen incoming calls. The privacy screening service provides information to the called party (in this case, the subscriber to the privacy screening service) that allows the subscriber to make an informed decision as to whether or not to answer a call. For example, a subscriber may (and typically does) use the privacy screening service to block all unidentified calls from going through. Private telephone numbers are telephone numbers that block services such as "caller ID" that would otherwise identify the caller to the called party. In telephone systems that offer private numbers and a privacy screening service to its customers, a call from a private number to a subscriber with the privacy screening service cannot be completed automatically, unless the caller authorizes the system to override the privacy of his number.

Typically, when a caller such as a telemarketer places a call to a subscriber of a privacy screening service, the caller will block the display of the calling party's telephone number. A called party who subscribes to privacy screening typically will not chose to override the privacy screening feature and hence will not receive the call. The caller will accrue a charge for the call (frequently, a long-distance charge) even though the caller has not been able to speak to the called party. In many cases (e.g., the caller makes a considerable number of local toll or long-distance calls) this results in the accrual of considerable call charges even though the calls are not completed. It would be helpful if there were a service that would enable the caller to determine if a called party is a subscriber to a privacy screening service, before a charge accrues to the caller or to otherwise indicate to a billing system that these calls are to be billed at a different rate.

SUMMARY OF THE INVENTION

In the present invention, the aforementioned need is satisfied by a system and method that enables a caller to detect subscribers to a privacy screening service. The system and method are employed in combination with an AIN-based telephone network having a service control point (SCP) and a database of information associated with the SCP. The present invention is initiated when a calling party who subscribes to the "caller detection of privacy screening" service calls a second (called) party. After the calling party enters the telephone number of the called party, the service places a query to the SCP. The SCP determines if the called party is a subscriber to privacy screening. If the called party is a subscriber to privacy screening, a message is sent from the SCP to the service switching point (SSP) instructing the SSP to disconnect the call and providing billing information to the SSP. This billing information is forwarded from the SSP to a billing system for processing as a caller detection of privacy screening charge. If the called party is not a subscriber to privacy screening, the call is completed and normal charges accrue.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

DETAILED DESCRIPTION OF PREFERRED EMBODIMENTS

Advanced Intelligent Network (AIN) System

Referring now to the figures, a preferred embodiment of the system and method of the present invention will be described. Basic telephony concepts and terminology are used throughout the description as would be understood by one of skill in the art.

Figure 1:
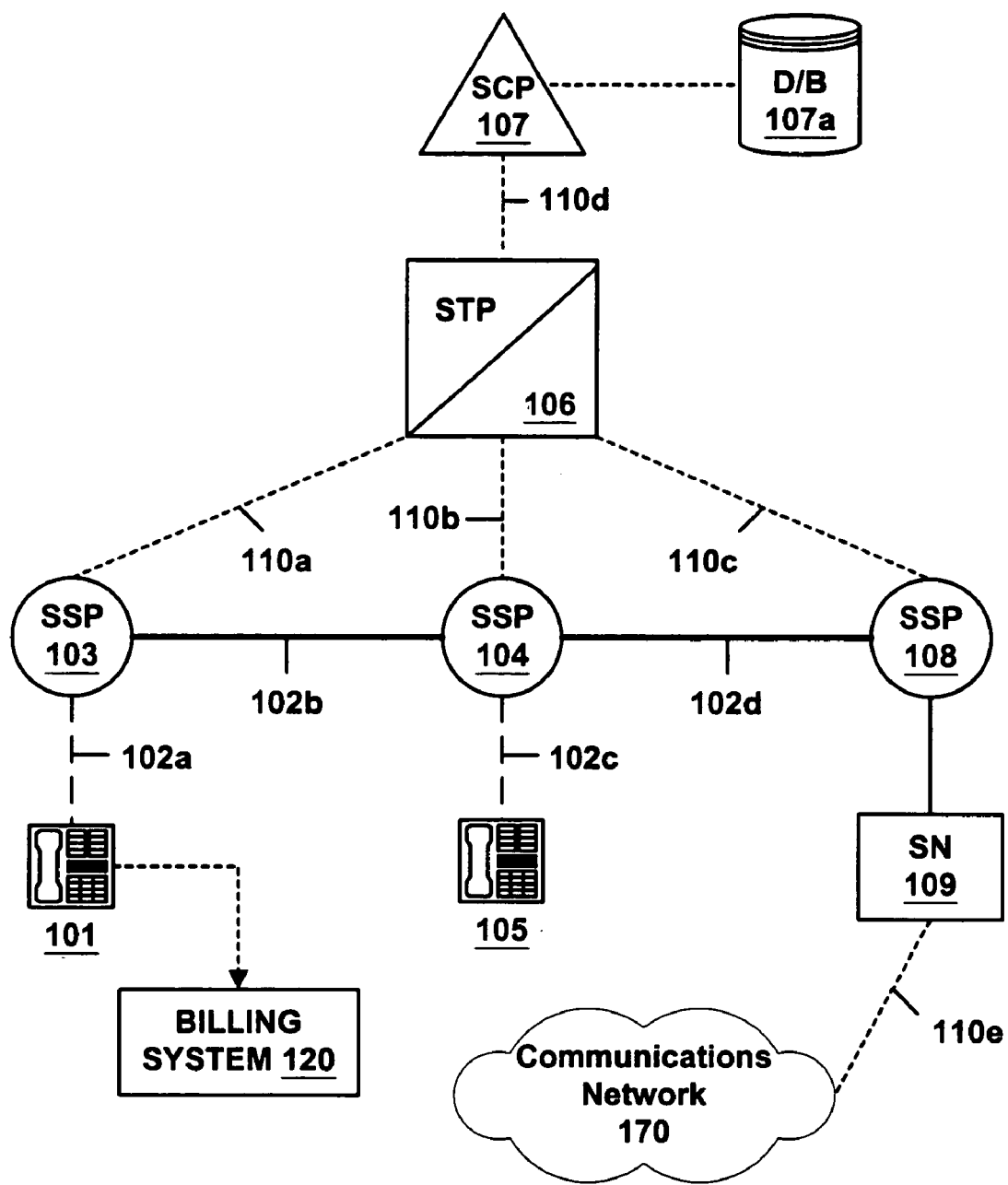
FIG. 1 illustrates, in a general block diagram form, an Advanced Intelligent Network (AIN) based system for implementing intelligent network management features, such as those which may be employed in connection with the present invention.

Referring now to FIG. 1, there is shown an exemplary telecommunication network. This exemplary environment is the public switched telecommunications network (PSTN). A portion of the PSTN is illustrated in FIG. 1 and is generally described below.

According to an aspect of the present invention, a system and method for caller detection of privacy screening may be implemented for an AIN or AIN-type network using a computer telephony system. The Advanced Intelligent Network system is described in U.S. Pat. No. 5,701,301 and U.S. Pat. No. 5,838,774, which are hereby incorporated by reference.

In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Referring now to the accompanying drawings, FIG. 1 illustrates a simplified AIN-based network arrangement incorporating the various features of the invention, as further described below. The AIN includes a variety of interconnected network elements. A group of such network elements includes a plurality of central offices (COs) 103, 104, 108 capable of generating AIN queries. Central Offices are also called service switching points (SSPs). A central office or SSP is a switch and the terms are used interchangeably herein. SSPs 103, 104 and 108 may comprise, for example DMS100, 5ESS or EWSD switches. These switches may be manufactured by, for example, Lucent Technologies, Inc., Nortel Networks or Siemens, respectively.

As further illustrated in FIG. 1, SSPs 103, 104 and 108 have a plurality of subscriber lines 102*a* and 102*c* connected thereto. Each SSP serves a designated group of subscriber lines, and thus, the SSP 103, 104 or 108 that serves a particular line may be referred to as its serving switch. Each line is connected typically to a piece of terminating equipment including a plurality of telephones designated, e.g., as 101 and 105. Although telephones are illustrated as the pieces of terminating equipment in FIG. 1, those skilled in the art will understand that such pieces include other telecommunications devices such as facsimile machines, computers, modems, etc.

Records of calls are maintained so that telephone users can be billed for the calls made. For example, calls made from one state to another state are typically billed at a long distance rate. Calls made from one message unit to another message unit are typically billed at a local toll call rate. Calls using special services such as return call (e.g., a telephone customer can dial "*66" to call the number of the last person to call the customer) are typically billed at a specified amount per use or a fixed rate per month. Information on the billing record typically includes the calling party (typically the party who will be billed for the call), the called party number (which determines the rate at which the call will be billed) and the service, if any, used to make the call. SSPs 103, 104 and 108 typically are associated with the transmission of billing records to a billing system 120. Information concerning the calling telephone directory number, the called telephone directory number and the type of service utilized in the call is typically included in the billing record sent by an SSP 103, 104 and 108 to billing system 120.

In the embodiment of FIG. 1, the system includes a first telephone station which for illustrative purposes will be referred to as telephone station 101 and a second telephone station 105. SSPs 103, 104 and 108 are interconnected by a plurality of trunk circuits 102*b* and 102*d*. These are the voice path trunks that interconnect the SSPs to connect communications. The term "communication" or "call" is used herein to include all messages that may be exchanged between caller and called party in the network illustrated in FIG. 1. Trunks 102*b* and 102*d* may be either a SS7 controlled or multi-frequency trunk (MF) and the type of trunk will be in accordance with both the sending and receiving SSP to which it is connected.

In the example shown in FIG. 1, each switch may include different types of facilities and/or triggers. SSPs 103, 104 and 108 are each programmable switches which may perform the following functions: recognize AIN-type calls, launch queries to service control point (SCP) 107, and receive commands and data from, for example, SCP 107 to further process and route AIN-type calls. When one of SSPs 103, 104 and 108 is triggered by an AIN-type call, the triggered SSP 103, 104 and 108 formulates and sends an AIN query. Based on the reply from the AIN type call, SSP 103, 104, and 108 responds to call processing instructions from the network element in which the AIN service logic resides. According to an aspect of the invention, the AIN service logic may reside at SCP 107.

Each of SSPs 103, 104 and 108 is connected to a signal transfer point (STP) 106 via respective data links 110*a*, 110*b* and 110*c*. In order to facilitate signaling and data messaging, each SSP 103, 104, and 108 may be equipped with Common Channel Signaling (CCS) capabilities, e.g., SS7, which provides two-way communications of data messages over CCS links 110*a*, 110*b* and 110*c* between components of the AIN network. In one embodiment, these data links employ a signaling protocol referred to as Signaling System 7 (SS7), which is well-known to those skilled in the art, although it should be understood that any other suitable protocol could be employed without departing from the spirit and scope of the invention.

The data messages may be formatted in accordance with the Transaction Capabilities Applications Part (TCAP). Alternatively, Integrated Service Digital Network (ISDN), Users Part (ISUP) may be used for signaling purposes between, for example, SSPs 103, 104 and 108. In such a case, SSPs 103, 104 and 108 may be equipped with the capability to map appropriate data between TCAP and ISUP protocols, and vice versa. The telephone network essentially employs an upper-level software controlled network through the STP 106 and SCPs 103, 104 and 108.

AIN SSPs 103, 104 and 108 may allow normal switch processing to be suspended at specific points in a call so that the switch may send an AIN message query via STP 106 to SCP 107. STP 106 is a signaling hub that routes packets of data over the common channel signaling network. Common channeling signaling are data communications networks laid over the system's switching network that carry data and control messages to and from and among the SSPs, STPs, and SCPs in the network. Signaling System 7 (SS7) is the protocol that runs over common channel signaling networks. A common channel signaling network using the Signaling System 7 protocol is often referred to as an SS7 network. The SS7 network carries data and control messages to the SSPs in the telephone network.

A set of triggers may be defined at SSPs 103, 104 and 108. A trigger in the AIN is an event associated with a particular call that initiates a query to be sent to SCP 107. The trigger may cause SCP 107 to access processing instructions with respect to the particular call. The results of processing at SCP 107, which may include database inquiries, are sent back to SSP 103, 104 or 108 through STP 106. The return packet may include instructions to SSP 103, 104 or 108 as to how to process the call. The instructions may be to take some special action as a result of a customized calling service, enhanced feature, or subscriber service. In response, SSP 103, 104 and 108 may move through its call states, and generate further packets that are used to set up and route calls. Similar devices for routing calls among various local exchange carriers are provided by regional STPs and regional SCPs.

An example of such a trigger is an off-hook delay trigger (OHDT), which causes a query to be sent to SCP 107 when a call is made from a particular calling line. Other triggers include a termination attempt trigger (TAT), which causes a query to be sent to SCP 107 whenever an attempt is made to complete a call and a Public Office Dialing Plan (PODP) trigger, although other suitable triggers may be used.

SCP 107 may execute software based service logic and return call-processing instructions to the triggering AIN SSP. New services may be provisioned by assigning AIN SSP triggers to customer lines, trunks, and/or North American Numbering Plan (NANP) telephone numbers.

Much of the intelligence of the AIN resides in an SCP 107 that is connected to STP 106 over an SS7 or other suitable data link 110*d*. SCPs are powerful fault-tolerant computers, e.g., AT&T Star Server FT Model 3200 or AT&T Star Server FT Model 3300 computers (these and more current computers such as the Advantage P200 and Advantage 4P200 models are presently available from Lucent Technologies). SCPs are "intelligence centers" with access to applications databases that enable the network to deliver advanced services such as caller ID, privacy screening, call forwarding and caller detection of privacy screening.

Among the functions performed by SCP 107 is the hosting of network databases that may be stored in database object 107a. Database object 107a is shown as a database communicatively coupled to SCP 107, although data storage object 107a may be embodied as a component within SCP 107, such as an internally-mounted hard disk device. The databases stored in data storage object 107a may be used in providing telecommunications services to a customer.

The SCPs also execute service package applications (SPAs) that deliver the advanced services. Typically, SCP 107 is also the repository of SPAs that are used in the application of telecommunications services, enhanced features, or subscriber services to calling lines. Additionally, SPAs may use databases for providing telecommunication services.

The system of FIG. 1 may also include a services circuit node (SCN) 109, which may also be referred to herein as services node (SN) 109. SNs are physically generally similar to SCPs, but include voice and Dual Tone Multi-Frequency (DTMF) signal recognition circuits, voice synthesizers, and voice recognition and digit collection capabilities. The operators of the telephone network can program their SNs to manage data, to respond to calls and to route calls as specified by the telephone network and to collect digits from a caller or subscriber. The SN's voice circuits can also be programmed to provide a voice response (e.g., to play pre-selected announcements) to callers and to perform voice recognition. SNs can also be programmed to respond to input from the callers by, e.g., further routing the call.

Thus SN 109 is a programmable interactive data system that can act as a switch to transfer calls. SN 109 may provide interactive help, collect voice information from participants in a call, provide notification functions and/or store subscriber data. SN 109 may be a Lucent Technologies Star Server FT Model 3200 or Model 3300 although other units may be employed without departing from the scope of the invention. SN 109 may include a data assembly interface. In addition, SN 109 may request SCP 107 to retrieve information from database 107a containing information concerning calling party 101, may receive information from SCP 107, may make outgoing calls to called party telephone station 105, may convert alphanumerical textual data to speech, may announce converted information retrieved from SCP 107 to called party telephone station 105 and/or may connect telephone station 101 to called party telephone station 105.

Communications link 111 between SSP 108 and SN 109 may be a primary rate interface (PRI) or basic rate interface (BRI) line or any other suitable telephone line. PRI and BRI lines are circuit-switched ISDN lines. SN 109 may be communicatively coupled to a network 170 via a data link 110e using an X25, TCP/IP or SS7 protocol or any other suitable protocol.

Accordingly, connections by links 110a, 110b, 110c, 110d and 110e are for signaling purposes and allow SSPs 103, 104 and 108 to send and receive messages to and from SCP 107 and SN 109. For purposes of illustration, various features of the present invention will now be described from the standpoint of a switch implementing AIN protocols, provisioned with OHDT (off-hook delay trigger), TAT (termination attempt trigger), or PODP (public office dialing plan) triggers. However, as will be apparent to those of ordinary skill in the art based on the disclosure provided herein, the present invention is not limited to implementation through these particular triggers and protocols and may be designed and provisioned with a network utilizing other triggers and protocols. For example, SSP 103, 104 and 108 may represent a TCP/IP telecommunications switching network gateway. One skilled in the art will further recognize that the above-described network is a simplified network meant for explanatory purposes. It is likely that a telephone network may comprise numerous user stations, SSPs, STPs, SCPs, and SNs along with other telephone network elements.

Existing Systems

In existing systems, at telephone station 101, the calling party may place a call to telephone station 105 (the called party). Assume that telephone station 105 serves a subscriber to a privacy screening service. When the caller places a call to the subscriber of telephone station 105, the call is routed by SSP 103 to SSP 104. Because telephone station 105 subscriber has subscribed to the privacy screening service, that call triggers a termination attempt trigger or TAT. In response to the TAT, SSP 104 sends a message to SCP 107 via STP 106, asking for directions as to how the call should be completed. The query sent to SCP 107 includes the following information: the subscriber's telephone number (in the called party field), the calling party's telephone number (in the calling party field), the calling party's presentation restriction indicator (also in the calling party field) and optionally, the trigger criteria type (indicating the service for which the query is intended).

SCP 107 checks the presentation indicator in the calling party field of the query received as a result of the termination attempt trigger. If presentation of the caller's number is not restricted, i.e., if the caller's number is public, SCP 107 sends back a response, instructing SSP 104 to complete the call, and, typically, to supply the caller's telephone number to the called party. If the called party has subscribed to a higher level of service, such as "caller ID deluxe", the caller's name and telephone number may also be supplied. In that case, SSP 104 completes the call, i.e., completes the call, supplying the privacy screening subscriber with the caller's number (and possibly also with the caller's name). If the caller's name is to be supplied to the customer, SSP 104 may launch another query to the SCP 107 to obtain the caller's name from either database 107a or another database on the system that contains the names corresponding to the telephone number of the caller.

The calling party may also be asked to record his or her name whenever the calling party number is private or unknown. In this case, if the caller's number is private or unknown, SCP 107 enters the privacy screening subscriber's telephone number in the calling party field and directs SSP 104 to forward the call to SN 109. When SN 109 answers the call, it typically asks the calling party to record his or her name. If the calling party responds by recording his or her name, SN 109 then completes the call, using the subscriber's telephone number that had been stored in the calling party field.

The TAT provisioned on the subscriber's line at SSP 104 triggers a second time, sending a query to SCP 107 through STP 106. SCP 107 recognizes that this call originated with a services node, SN 109, and sends a response authorizing completion to the subscriber. If the subscriber chooses to accept the call, the call is put through. If the subscriber refuses to accept the call, the calling party is informed that his or her call was not accepted, a charge is accrued to the calling party and the call is disconnected.

An alternate existing system enables calls to be completed to a subscriber to a privacy screening service, even when the calling party is either private or unknown, and preserves the calling party number when the calling party number is known (whether the calling party number is public or private). In this case, when the calling party dials the subscriber's number, the call is routed through the caller's SSP (SSP 103) to the privacy screening subscriber's SSP 104. The call triggers the subscriber's TAT at SSP 104, triggering a query that is sent up to SCP 107 via STP 106. SCP 107 checks the calling party ID and presentation indicator for the telephone number in the query, determines whether the calling party is known and public, known and private or unknown. If the calling party is known and public, SCP 107 sends back a response authorizing completion to the subscriber. SSP 104 then completes the call to the subscriber presenting the privacy screening subscriber the calling party's number and name, if the subscriber has subscribed to a service that provides the calling party's name as well as the calling party's number.

If the calling party number is private, SCP 107 re-writes the presentation indicator as "public" i.e., redefining the presentation indicator in the presentation indicator field (i.e., the presentation_restricted_indicator portion of the calling party ID field in the query as public). SCP 107 responds to the TAT query from SSP 104 by directing SSP 104 to forward the call to SN 109, with the presentation indicator re-written as public. SCP 107 responds to the TAT query from SSP 104 by directing SSP 104 to forward the call to SN 109, with the presentation indicator re-written as public. SSP 104 writes the subscriber's number in the "re-directing party" field, and forwards the call to SN 109 at SN 109's number via SSP 108. Thus, when the call is presented to SN 109, the call has the subscriber's number in the "re-directing party" field, and the original calling party's number in the "calling party" field. Because SCP 107 has toggled the presentation indicator from "private" to "public", SN 109 has access to the calling party number. SN 109 answers the call, and plays an announcement to the calling party, asking for his/her permission to present his/her number (and name) to the privacy screening subscriber. If the calling party refuses to grant permission to present his/her number (and name) to the subscriber, the call is disconnected. If the calling party agrees to have his/her number (and name) presented, further processing is performed and the call is completed.

Thus it can be seen that in either of the systems described above, if the calling party does not agree to have his/her number and name presented to a called party who subscribes to a privacy screening service, the call is disconnected.

Caller Detection of Privacy Screening

FIG. 1 shows a caller's telephone 101 connected via the calling party's voice line 102a to its SSP 103. SSP 103 is connected via voice trunk 102b to a second SSP (SSP 104). SSP 104 is the SSP that services the called party's telephone 105. For example, the called party may be a subscriber to the privacy screening service and the calling party may be a subscriber to a caller detection of privacy screening service.

When a caller subscribes to caller detection of privacy screening in accordance with the present invention, the caller is preferably prompted to enter a list of telephone numbers to which caller detection of privacy screening will not be applied. For example, if a caller frequently makes calls to a particular privacy screening subscriber, that subscriber's telephone number may be added to list of telephone numbers to which the caller detection of privacy screening service is not applied. Preferably, this list is prompted for at service set up time and can be modified during the pendency of the subscriber service by contacting a service person, or by other suitable means.

When a subscriber to caller detection of privacy screening at telephone station 101 places a call to the called party at telephone station 105, the call is routed to SSP 103. Because of the activation of the off-hook delay trigger, the called number is compared with the list of telephone numbers associated with the calling party to which the caller detection of privacy screening is not applied. If the called party number matches one of the numbers on the list, the caller detection of privacy screening service is bypassed. Similarly, if the calling information is not complete, the caller detection of privacy screening service is bypassed. Such a situation may occur when the information sent to SSP 103 does not include calling party number and called party number, as would occur, for example, when an enhanced feature (such as "*69" to determine the number of a last called party) is accessed. Similarly, if the called number is an emergency number such as "911", the caller detection of privacy screening service is bypassed so that an emergency call will be completed even if SCP 106 is not operational.

If, however, a calling party who subscribes to caller detection of privacy screening places a call to a number not on the list of numbers that bypass the caller detection of privacy screening service, and if enough information was received to process the call (i.e., the SSP 103 receives the called party number and the calling party number), an Off-Hook Delay trigger is preferably triggered at SSP 103. At this point, the call is suspended. In response to the off-hook delay trigger, SSP 103 sends a query to SCP 107 via STP 106 asking for directions as to how the call should be completed. The query includes the following information, for example,: the subscriber to caller detection of privacy screening's telephone number (in the calling party field), the called party's telephone number (in the called party field), the calling party's presentation restriction indicator (also in the calling party field), and, optionally, the trigger criteria type (indicating the service for which the query is intended).

SCP 107 looks up the called party's telephone directory number in its database 107a to see if the called party's telephone number is associated with a privacy screening service. If the called party is associated with a privacy screening service, SCP 107 sends a message to SSP 103 instructing SSP 103 to disconnect the call. SCP 107 additionally sends SSP 103 information to be included on a billing record that SSP 103 sends to billing system 120. The information preferably includes the calling number, the called number and an indication that the caller detection of privacy screening service detected a subscriber to privacy screening. The billing system 120 may bill these calls at a special rate, such as a flat monthly charge of a specified dollar amount, or at a rate that is lower than the ordinary rate, or by any suitable billing scheme. Optionally, an audible message may be presented by SN 109 to the calling party indicating that the party called is a subscriber to a privacy screening service and that the call will be disconnected.

If the called party is not associated with a privacy screening service, the call is completed, and a billing record is generated, preferably including calling party number, called party number but, since the called party was not a subscriber to privacy screening, the indicator of use of the caller detection of privacy screening is not included.

Figure 2:
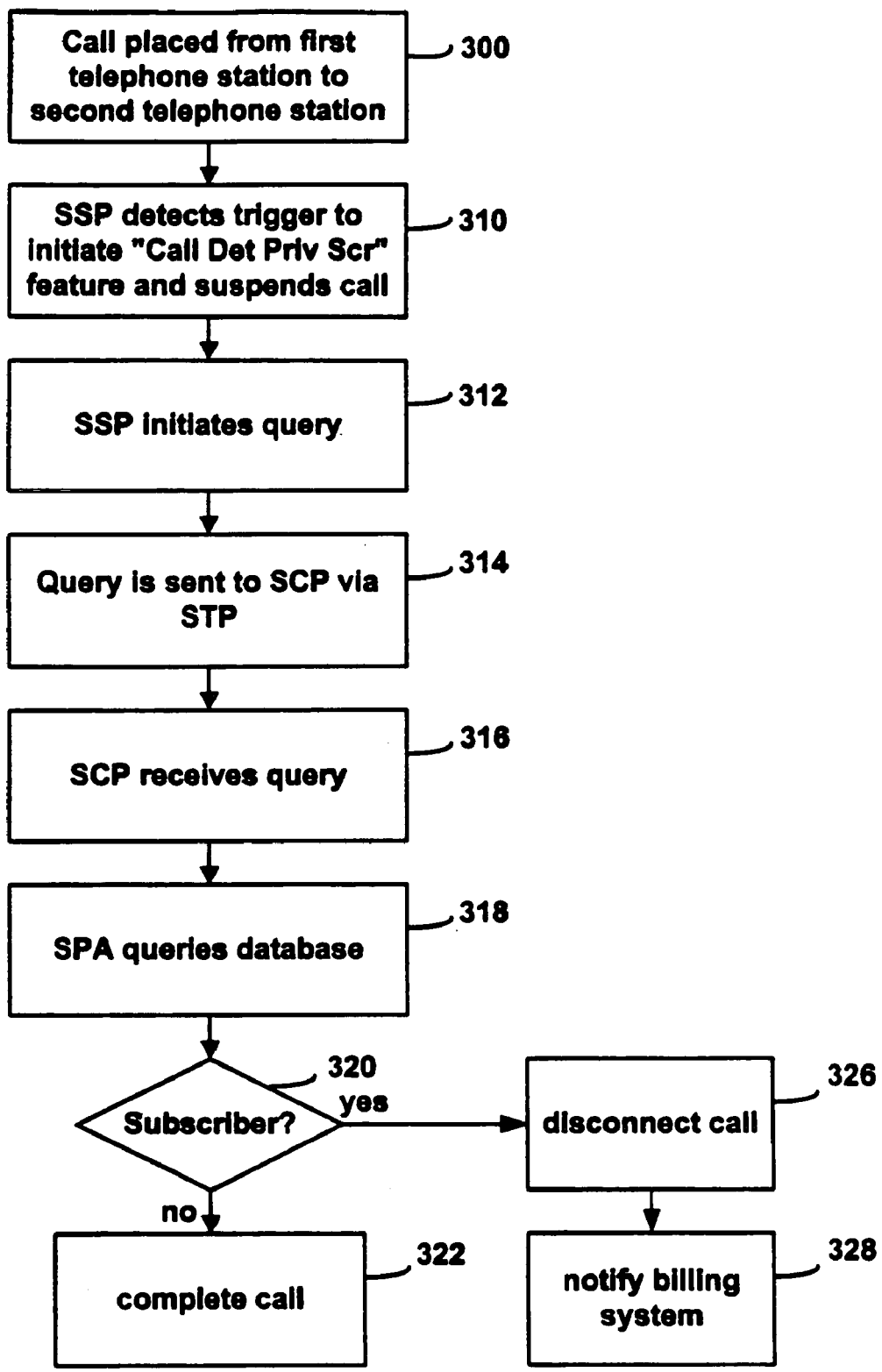
FIG. 2 is a flowchart of an exemplary process for providing a service for caller detection of a privacy screening service in accordance with the present invention.

Referring now to FIG. 2, there is illustrated an exemplary overview of the call flow logic according to an aspect of the present invention. Not shown in FIG. 2, but present in one embodiment of the present invention, is the entering of telephone numbers to a list (preferably taking place at service set-up time). Calls to numbers on the list will not invoke the caller detection of privacy screening service. The call flow for the caller detection of privacy screening as illustrated in FIG. 2 begins when, at step 300, a subscriber to caller detection of privacy screening at telephone station 101 (the calling party) places a call to telephone station 105 (the called party). The telephone number called is compared to the list of numbers for which caller detection of privacy screening is not invoked. If found, the call is routed over the telephone network via normal procedures. If not found, at step 310, SSP 103 detects the off-hook delay trigger associated with the calling party's number and suspends the call.

At step 312, SSP 103 initiates a query associated with the privacy screening detection service. At step 314, the query is routed to SCP 107 via STP 106. Accordingly, the query contains information identifying telephone station 101 (the calling party) and called party 105.

At step 316, SCP 107 receives the query and at step 318, SCP 107 responds to the query by launching an instance of a logic program that is referred to herein as a service package application (SPA). SPA queries database 107*a* associated with SCP 107 using the information contained in the query. Specifically, the application uses the information identifying telephone station 105 to determine whether called party associated with telephone station 105 subscribes to privacy screening.

If it is determined at step 320 that called party 105 is not a subscriber to privacy screening, the call is completed at step 322.

If it is determined at step 320 that called party 105 is a subscriber to privacy screening, SCP 107 sends information to SSP 103 including but not limited to, instructions to disconnect the call and a billing indicator that indicates that caller detection of privacy screening detected a call made to a subscriber to privacy director. At step 326, the call is disconnected. At step 328, SSP 103 sends a billing record preferably including the calling party number, the called party number and the caller detection of privacy screening indicator to billing system 120.

In one embodiment SN 109 may be employed to generate an announcement to the calling party subscriber to caller detection of privacy screening, using computer-generated text-to-speech conversion routines or in an alternate embodiment, using pre-recorded sound files or other suitable files. The announcement further preferably provides notice that the call will be disconnected because the called party subscribes to privacy screening.

It is noted that the foregoing examples have been provided merely for the purpose of explanation and are in no way to be construed as limiting of the present invention. While the invention has been described with reference to preferred embodiments, it is understood that the words used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Additionally, certain features and functions attributed to a particular network element may be performed by another network element without departing from the scope and spirit of the invention. As an example, if a function such as a database query is attributed to a network element such as an SSP, such query may be performed alternatively or additionally by an SCP or by any other suitable network element without departing from the spirit and scope of the invention.

What is claimed is:

1. A method for detecting a call made to a telephone station associated with a privacy screening service routed from a first telephone station to a second telephone station via a switching network, comprising:
    intercepting a call from a first telephone station, the first telephone station associated with a subscriber to a caller detection of privacy screening service, the call directed to a second telephone station;
    determining if the second telephone station requires identification of the first telephone station for completion of the call; and
    in response to determining that the second telephone station requires identification of the first telephone station for completion of the call, automatically disconnecting the call before a charge for connecting the call accrues to the first telephone station.

2. The method of claim 1, further comprising intercepting the call from the first telephone station to the second telephone station based on an indicator associated with the first telephone station.

3. The method of claim 2, further comprising allowing the call to proceed if a directory number of the second telephone station is included in a list associated with the first telephone station.

4. The method of claim 1, wherein, in response to determining that the second telephone station does not require identification of the first telephone station, completing the call.

5. The method of claim 1, further comprising sending an indicator to a billing system to identify a call sent from the first telephone station to the second telephone station wherein the second telephone station requires the identification of the first telephone station for completion of the call.

6. The method of claim 1, wherein the method is performed in an Advanced Intelligent Network (AIN) having a service switching point and a service control point, wherein said service switching point hosts an off-hook delay trigger associated with the first telephone station, and wherein said intercepting act comprises:
    actuating said off-hook delay trigger; and
    querying the service control point to obtain information associated with the second telephone station from a database stored at the services control point.

7. The method of claim 6, wherein in response to determining that the information associated with the second telephone station indicates that identifying information must be supplied by a calling party to the second telephone station before the call can be completed, disconnecting the call.

8. The method of claim 6, wherein in response to determining that identifying information does not need to be supplied by a calling party to the second telephone station before the call can be completed, the call is completed.

9. The method of claim 1, further comprising intercepting the call from the first telephone station to the second telephone station based on actuation of a trigger type event.

10. An advanced intelligent network comprising:
a service switching point communicatively connected to a first party telephone station, the first telephone station associated with a subscriber to a caller detection of privacy screening service;
the service switching point including an off-hook delay trigger, which takes an action when an outgoing call destined for a second telephone station associated with a subscriber to a privacy screening service is received, one or more actions including generating a query;
a service control point, communicatively connected to a second service switching point, which receives said query from the first telephone station and which, based on the query, instructs the first service switching point to automatically disconnect the call before a charge for connecting the call accrues to the first telephone station.

11. The advanced intelligent network of claim 10, further comprising a services node, the services node including: a voice synthesizer which generates an audible message.

12. The advanced intelligent network of claim 11, wherein the services node generates an audible message to a first party telephone station when the call is disconnected.

13. The advanced intelligent network of claim 10, wherein the service control point generates a message and sends the message to the service switching point for inclusion on a billing record created by the services switching point and sent to a billing system.

14. A computer-readable medium comprising computer-executable instructions for:
intercepting a call from a first telephone station, the first telephone station associated with a subscriber to a caller detection of privacy screening service, the call directed to a second telephone station;
determining if the second telephone station requires identification of the first telephone station for completion of the call; and in response to determining that the second telephone station requires identification of the first telephone station for completion of the call, automatically disconnecting the call before a charge for connecting the call accrues to the first telephone station.

15. The computer-readable medium of claim 14, comprising further instructions for intercepting the call from the first telephone station to the second telephone station based on an indicator associated with the first telephone station.

16. The computer-readable medium of claim 14, comprising further instructions for allowing the call to proceed if a directory number of the second telephone station is included in a list associated with the first telephone station.

17. The computer-readable medium of claim 14, comprising further instructions for in response to determining that the second telephone station does not require identification of the first telephone station, completing the call.

18. The computer-readable medium of claim 14, comprising further instructions for sending an indicator to a billing system to identify a call sent from the first telephone station to the second telephone station wherein the second telephone station requires the identification of the first telephone station for completion of the call.

19. The computer-readable medium of claim 14, comprising further instructions for intercepting the call from the first telephone station to the second telephone station based on actuation of a trigger type event.

* * * * *